(12) United States Patent
Yasumoto

(10) Patent No.: US 9,779,040 B2
(45) Date of Patent: Oct. 3, 2017

(54) PORTABLE DEVICE, SYSTEM, AND INFORMATION PROCESSING APPARATUS

(71) Applicant: FUJITSU LIMITED, Kawasaki-shi, Kanagawa (JP)

(72) Inventor: Tomonori Yasumoto, Kokubunji (JP)

(73) Assignee: FUJITSU LIMITED, Kawasaki (JP)

( * ) Notice: Subject to any disclaimer, the term of this patent is extended or adjusted under 35 U.S.C. 154(b) by 0 days.

(21) Appl. No.: 15/064,899

(22) Filed: Mar. 9, 2016

(65) Prior Publication Data

US 2016/0283419 A1 Sep. 29, 2016

(30) Foreign Application Priority Data

Mar. 23, 2015 (JP) ................... 2015-058931

(51) Int. Cl.
| G06F 13/20 | (2006.01) |
| G06F 13/10 | (2006.01) |
| G06F 13/40 | (2006.01) |
| G06F 13/42 | (2006.01) |

(52) U.S. Cl.
CPC ............ *G06F 13/20* (2013.01); *G06F 13/102* (2013.01); *G06F 13/4068* (2013.01); *G06F 13/4282* (2013.01)

(58) Field of Classification Search
CPC .... G06F 13/10; G06F 13/102; G06F 13/4068; G06F 13/20
See application file for complete search history.

(56) References Cited

U.S. PATENT DOCUMENTS

| 2003/0046596 A1* | 3/2003 | Floyd ................. H04L 1/24 713/400 |
| 2008/0067249 A1* | 3/2008 | Nakatsugawa ........ G06Q 20/32 235/451 |
| 2011/0225404 A1* | 9/2011 | Thill .................... G06K 7/0008 713/2 |

(Continued)

FOREIGN PATENT DOCUMENTS

| JP | 2012-525647 A | 10/2012 |
| WO | 2010/129336 A2 | 11/2010 |

*Primary Examiner* — Farley Abad
(74) *Attorney, Agent, or Firm* — Westerman, Hattori, Daniels & Adrian, LLP

(57) ABSTRACT

A portable device includes: a first interface circuit configured to receive, from an information processing apparatus, device information of the information processing apparatus; a second interface circuit configured to receive, from outside device through wireless communication link, a start signal for the information processing apparatus; a memory configured to store a list of information processing apparatuses that are to be permitted to perform wireless communication with the portable device; and a processor configured to compare the device information received from the information processing apparatus with the list stored in the memory, enable wireless communication functionality of the second interface circuit when a result of the comparison indicates that the portable device is coupled to an information processing apparatus which is permitted to perform wireless communication, and transmit a start signal to the information processing apparatus when the start signal is received by using the enabled wireless communication functionality.

10 Claims, 9 Drawing Sheets

(56) References Cited

U.S. PATENT DOCUMENTS

2012/0071134 A1* 3/2012 Jensen ................ H04M 1/6033
                                                        455/411
2012/0239851 A1* 9/2012 Calvert ............... G06F 11/1441
                                                        711/103

* cited by examiner

PORTABLE DEVICE, SYSTEM, AND INFORMATION PROCESSING APPARATUS

CROSS-REFERENCE TO RELATED APPLICATION

This application is based upon and claims the benefit of priority of the prior Japanese Patent Application No. 2015-058931, filed on Mar. 23, 2015, the entire contents of which are incorporated herein by reference.

FIELD

The embodiment discussed herein is related to a portable device, a system, and an information processing apparatus.

BACKGROUND

Information processing apparatuses, such as personal computers (PCs), are used with various types of portable devices coupled to them for the purpose of extensibility. For example, an information processing apparatus is provided with a universal serial bus (USB) terminal and a card slot via which external memory, an interface for coupling a printer or a projector, and a portable device for wireless communication are coupled to the information processing apparatus and are used.

It is desired that such a portable device not only properly operate but also meet predetermined rules and criteria. It is also desired that the side of an information processing apparatus to which a portable device is coupled be constructed so as to allow the portable device to operate normally.

For example, if a portable device has wireless communication functionality for coupling an information processing apparatus to an external network, the portable device has to adhere to technical criteria, such as maximum permitted spurious emission power levels for use with radio equipment established by each country. On the side of the information processing apparatus to which the portable device is coupled, the information processing apparatus has to be inhibited from being used not normally when the information processing apparatus controls the portable device.

In such a manner, it is desired in some cases that both a portable device and an information processing apparatus to which the portable device is coupled have been certified as being in compliance with technical criteria.

For example, in the United States, the U.S. Federal Communication Commission (FCC) has made regulations stating that, in cases where a portable device having wireless communication functionality is custom installed in an information processing apparatus, such as a PC, by the user, in order to ensure that the portable device definitely enters a state certified by the FCC, (a) when a wireless communication device that has not been certified is coupled to the information processing apparatus, a wireless communication unit of the wireless communication device does not operate, and (b) when the wireless communication device is coupled to a device other than an information processing apparatus that has been certified in the FCC, the wireless communication unit does not operate.

Traditionally, as a way to comply with the regulation of (a), the information processing apparatus is configured such that a basic input/output system (BIOS) unit, which is input and output control software of the information processing apparatus, detects information specific to the portable device included in the wireless communication device and then, if matching of the information is successful, recognizes the portable device as a device certified by the FCC and, if the matching fails, does not recognize the portable device as a device certified by the FCC.

As a way to comply with the regulation of (b), the configuration is provided such that a list of devices that have been certified by the FCC is stored in a write-protected manner on the side of a portable device having wireless communication functionality, and the wireless communication functionality is enabled only if the information processing apparatus is a device that has been certified when the portable device is coupled to the information processing apparatus.

As an example of the related art techniques, Japanese National Publication of International Patent Application No. 2012-525647 is known.

In some cases, an information processing apparatus is configured so as to be started via a wireless communication network and execute a given process. For example, while the information processing apparatus causes communication functionality built in the information processing apparatus to enter the active state, the information processing apparatus itself is left in a standby state and is started based on a start signal from the outside.

Communication functionality is very preferable for such information processing apparatuses; however, many of the information processing apparatuses themselves do not have wireless communication functionality. In this case, a portable device having wireless communication functionality and having a capability of receiving a start signal for the information processing apparatus from the outside has to be coupled to the information processing apparatus via a USB interface (USB terminal) or the like.

However, in a portable device coupled to an information processing apparatus as described above, it has to be confirmed that the information processing apparatus used in connection with the portable device is a device that has been certified by the FCC or the like.

Traditionally, on condition that an information processing apparatus has been started, authentication has been performed by a portable device; however, an authentication method for cases where the information processing apparatus is in a standby state has not been taken into account.

SUMMARY

According to an aspect of the invention, a portable device includes: a first interface circuit configured to receive, from an information processing apparatus, device information of the information processing apparatus; a second interface circuit configured to receive, from outside device through wireless communication link, a start signal for the information processing apparatus; a memory configured to store a list of information processing apparatuses that are to be permitted to perform wireless communication with the portable device; and a processor configured to compare the device information received from the information processing apparatus with the list stored in the memory, enable wireless communication functionality of the second interface circuit when a result of the comparison indicates that the portable device is coupled to an information processing apparatus which is permitted to perform wireless communication, and transmit a start signal to the information processing apparatus when the start signal is received by using the enabled wireless communication functionality.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

DESCRIPTION OF EMBODIMENT

It is an object of one aspect of the present embodiment to provide a portable device that has wireless communication functionality and has a capability of receiving from the outside a start signal for an information processing apparatus coupled to the portable device, and that may achieve authentication of the information processing apparatus, and an information processing apparatus in accordance with the portable device.

According to one aspect of an embodiment of the portable device of the present disclosure, a start signal is received under the condition that it has been pre-certified whether or not wireless communication functionality may be enabled, and thus a start signal may be output to an information processing apparatus even if the information processing apparatus is kept in a standby state.

First, a way of providing a lock/unlock instruction for a wireless communication unit when an information processing apparatus is started will be described with reference to FIG. 1 and FIG. 2.

As hardware configurations for this description, both cases where a wireless communication device is built in a personal computer or the like and where a portable device having wireless communication functionality is coupled to it are conceivable. Both such cases are publicly known and thus will not be described in detail. Note that the "wireless communication unit" described with reference to FIG. 1 and FIG. 2 represents both that built in an information processing apparatus itself, such as a personal computer, and a portable device coupled via a USB terminal or the like.

Figure 1:
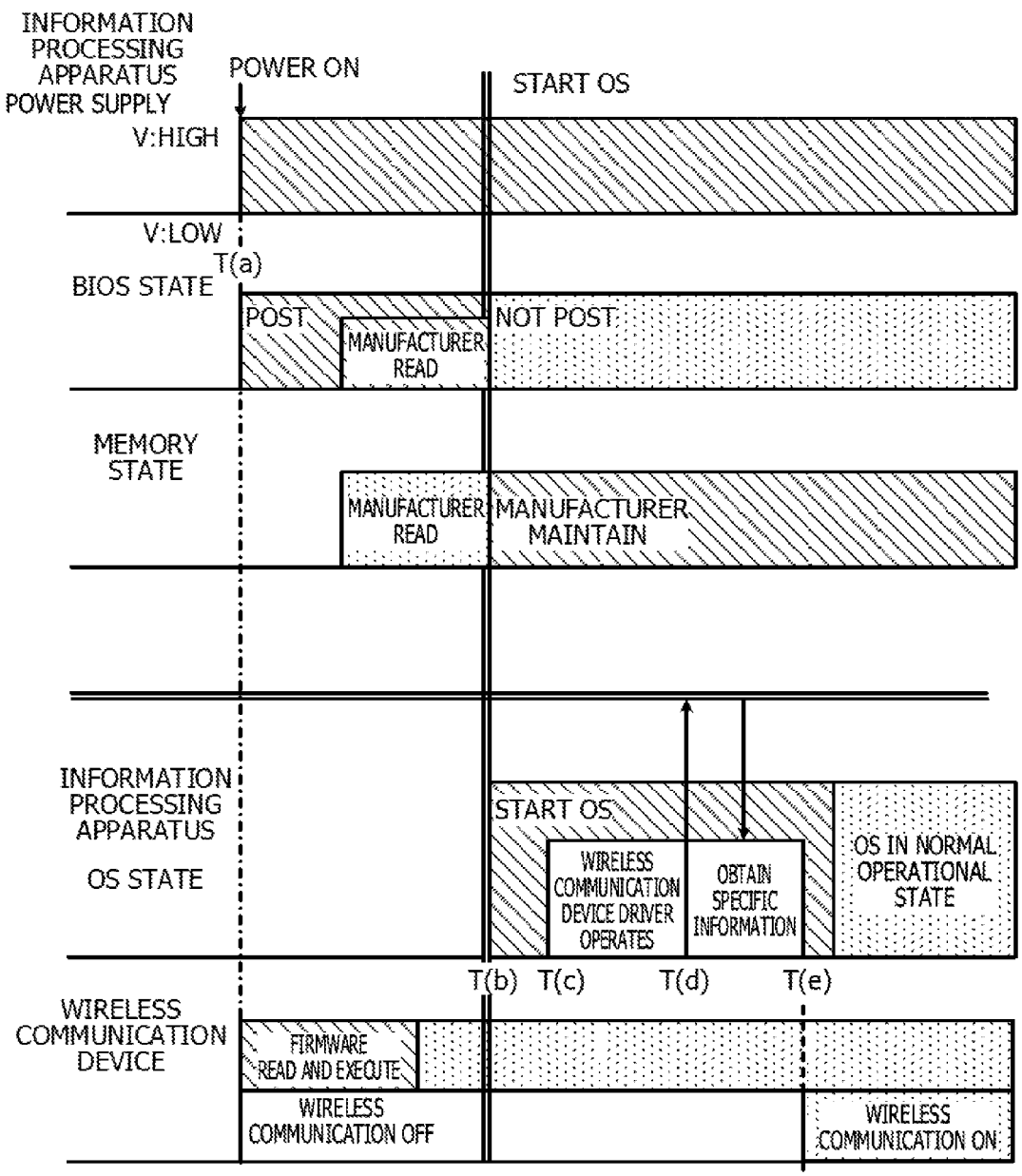
FIG. 1 is a diagram illustrating timings at which lock/unlock instructions for a wireless communication unit are provided in an information processing apparatus.
Figure 2:
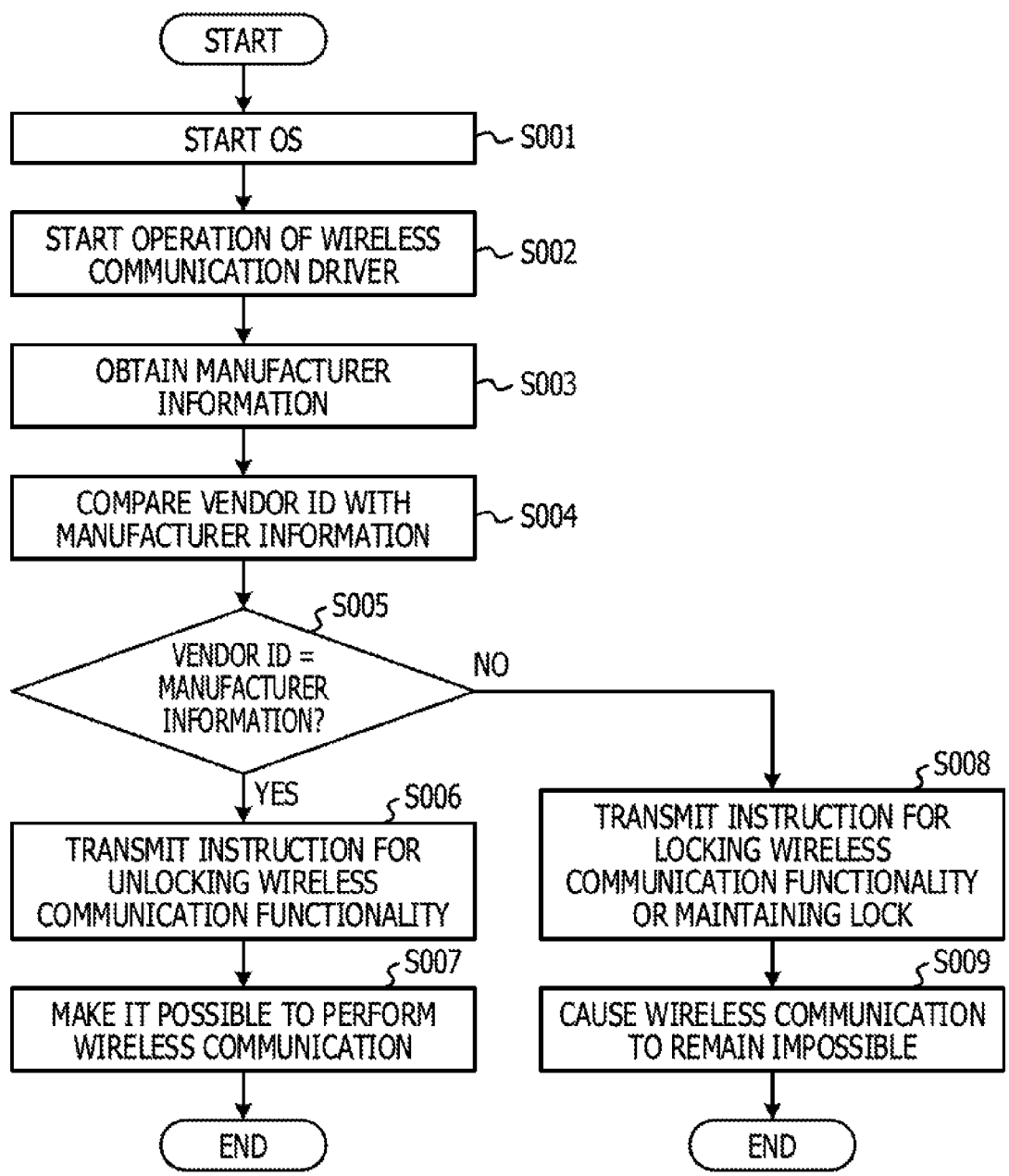
FIG. 2 is a flowchart of providing a lock/unlock instruction for the wireless communication unit in the information processing apparatus.

FIG. 1 is a diagram illustrating timings at which lock/unlock instructions for a wireless communication unit are provided in an information processing apparatus. FIG. 2 is a flowchart of providing a lock/unlock instruction for the wireless communication unit in the information processing apparatus.

In a wireless communication system, an information processing apparatus and a wireless communication device coupled to the information processing apparatus are used. In the information processing apparatus, the power is turned on (power-on) (time T (a)) to start the BIOS, and then the OS is started (time T (b)). In the information processing apparatus, after the OS is started, a device driver corresponding to each device starts to operate (time T (c)), and a wireless device driver corresponding to the wireless communication device operates. Once the wireless device driver operates, the information processing apparatus obtains information processing apparatus specific information stored in a storage unit of the information processing apparatus, via the OS, (time T (d)), and, if it is determined that the information processing apparatus specific information is information certified by the FCC, releases the lock of the wireless communication unit and transmits an instruction for turning on the wireless communication unit (time T (e)). In the wireless communication device, based on the transmitted instruction, the wireless communication unit is turned on, which enables wireless communication to be performed by the information processing apparatus certified by the FCC.

Next, the lock/unlock process of the existing wireless communication unit will be described with reference to FIG. 2. The information processing apparatus starts the OS (S001). The timing at which the OS is started is time T (b) illustrated in FIG. 1. The information processing apparatus is powered on at time T (a). Next, the wireless communication driver starts to operate on the OS (S002). The timing at which the wireless communication driver starts to operate is time T (c) illustrated in FIG. 1. Next, the wireless communication driver obtains manufacturer information from memory provided in the information processing apparatus (S003), and the wireless communication driver compares a vendor ID indicating a particular vendor registered in the driver with the obtained manufacturer information (S004). This timing is time T (d) illustrated in FIG. 1.

It is determined whether or not the vendor ID within the wireless communication driver matches the manufacture information (S005). If the vendor ID matches the manufacturer information (S005: Yes), the wireless communication driver of the information processing apparatus transmits an instruction for releasing the lock (unlocking) of the wireless communication functionality via a USB to a firmware program of the wireless communication device (S006). The timing at which an instruction for unlocking is transmitted is time T (e) illustrated in FIG. 1. This enables the information processing apparatus to perform wireless communication using the wireless communication device (S007).

On the other hand, if, when it is determined that the vendor ID within the wireless communication driver matches the manufacturer information (S005), the vendor ID does not match the manufacturer information (S005: No), the wireless communication driver of the information processing apparatus transmits an instruction for locking the wireless communication functionality or maintaining the lock to the firmware program of the wireless communication device via the USB (S008). Thereby, the information processing apparatus may inhibit wireless communication from being performed using the wireless communication device (S009).

As described above, authentication of wireless communication functionality is easy when the information processing apparatus is started. However, when the information processing apparatus is started via wireless communication from the outside, the information processing apparatus is not able to perform authentication in such a way as described above if the information processing apparatus is in a standby state (at least the OS part is not started).

Nonetheless, since if wireless communication functionality is built in the information processing apparatus, it is guaranteed before starting that they have been integrally certified, it is easy to start only the wireless communication functionality while keeping the information processing apparatus in a standby state.

However, when a portable device having wireless communication functionality that is isolated from the information processing apparatus is coupled and used, it has to be confirmed whether or not the information processing apparatus to which the portable device is coupled is a valid device, that is, an information processing apparatus permitted to be used, each time the portable device is coupled to the information processing apparatus.

In such circumstances, in order to start the information processing apparatus using a portable device having a capability of starting the information processing apparatus via the wireless communication described above, the portable device has to perform authentication of the portable device even when the information processing apparatus is kept in a standby state.

Hereinafter, with reference to the accompanying drawings, an embodiment for carrying out the present disclosure will be described in detail.

In this case, by way of example, the portable device is described on the assumption that the portable device is a wireless communication device having wireless communication functionality and being used in connection with the information processing apparatus.

Hereinafter, with reference to FIG. 3 to FIG. 9, processing for an information processing apparatus to which the portable device is coupled in this case will be described. An information processing apparatus 100 and a wireless communication device 200, which is a portable device, use universal serial bus (USB) terminals as interfaces and are coupled so as to be mutually removable, using USB cables or the like.

Figure 3:
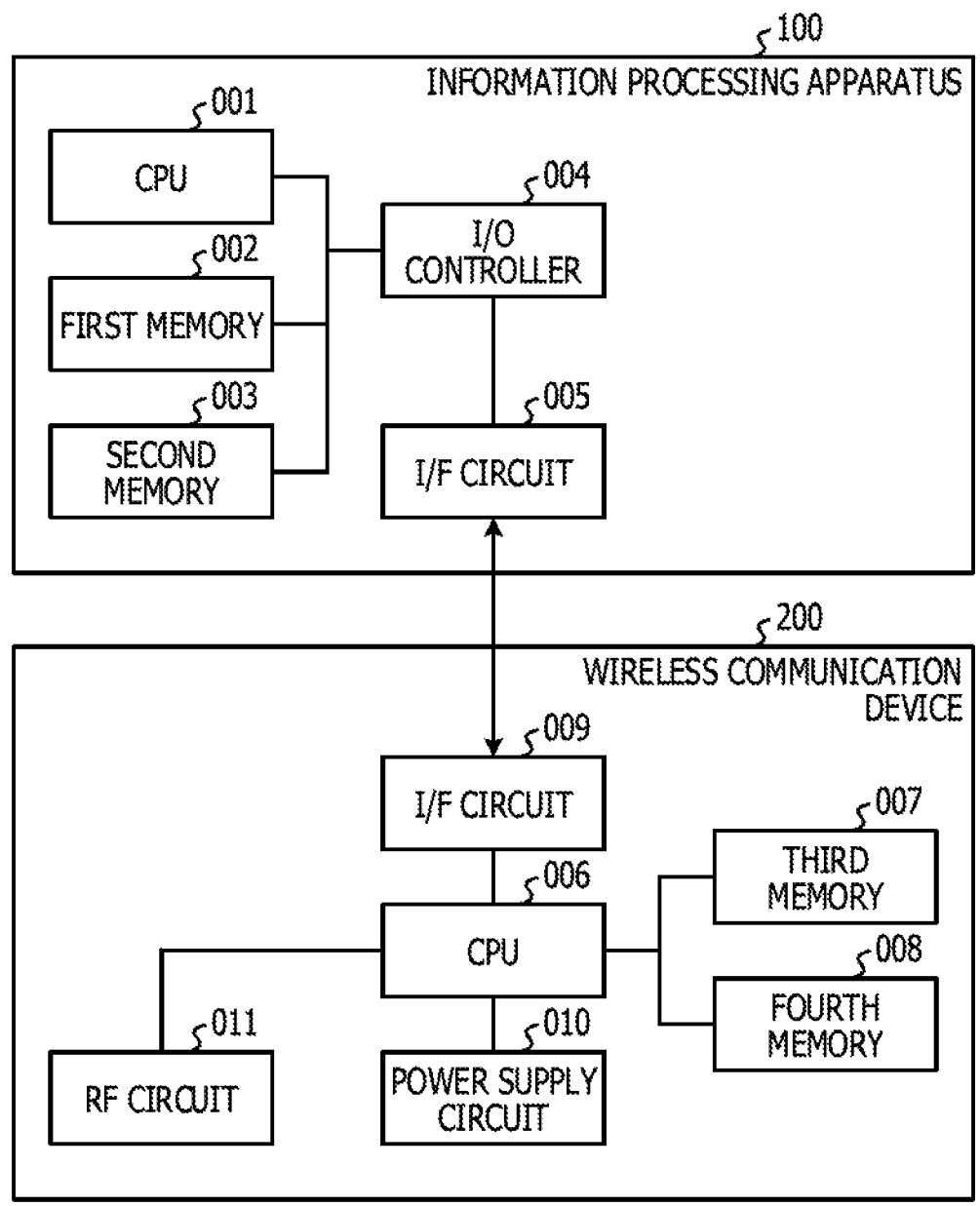
FIG. 3 is a diagram illustrating an example of a hardware configuration of an information processing apparatus and a wireless communication device coupled to it in the present disclosure.

FIG. 3 illustrates an example of a hardware configuration of an information processing apparatus and a wireless communication device coupled to it in the present disclosure.

The information processing apparatus 100 is configured so as to be able to perform wireless communication with a wireless wide area network (WAN) base station, which is not illustrated in the drawings, using the wireless communication device 200 coupled to the information processing apparatus 100. The information processing apparatus 100 is, for example, a tablet terminal, a notebook personal computer (PC), or the like.

As standards of communication performed using the wireless communication device 200, for example, Global System for Mobile Communications (GSM (registered trademark)), Long Term Evolution (LTE (registered trademark)), the Wideband Code Division Multiple Access (WCDMA (registered trademark)) method, High Speed Packet Access (HSPA), HSPA Evolution (HSPA+), and so on are used.

The information processing apparatus 100 includes a CPU 001 and at least a first memory 002 and a second memory 003, an input and output (I/O) controller 004, and an interface (I/F) circuit 005. The CPU 001 is a processing device for executing various operations of the information processing apparatus 100.

The CPU 001 executes an OS, which is basic software, stored in the first memory 002 described below. The OS is basic software of implementing a basic feature that runs input and output control software, which is in charge of management of hardware of the information processing apparatus 100 and so on, and application software. As the OS, for example, an OS, such as Microsoft (registered trademark), Windows (registered trademark), Android (registered trademark), or UNIX (registered trademark) may be used.

The first memory 002 is a storage device that stores data used for execution of the OS of the information processing apparatus 100 and various programs executed in the information processing apparatus 100. The CPU 001 reads and executes the OS and various programs from the first memory 002. As the first memory 002, a nonvolatile storage device such as a hard disk drive (HDD) or flash memory is used. Further, the BIOS, which is input and output control software, and programs of application software are stored in the first memory 002.

A second memory 003 is a storage device that temporarily stores programs executed by the CPU 001, various kinds of data, data obtained by operations of the CPU 001, and so on. Random access memory (RAM) or the like may be used as the second memory 003.

The I/F circuit 005 is an interface for performing input and output between the information processing apparatus 100 and an external device such as the wireless communication device 200. In this case, the I/F circuit 005 is described as being composed of a USB terminal. The information processing apparatus 100, via a USB terminal, is mutually coupled to the wireless communication device 200, which is similarly provided with a USB terminal.

The I/O controller 004 couples the CPU 001, the first memory 002, the second memory 003, and the I/F circuit 005 one another via a bus. As the I/O controller 004, for example, a north bridge or southbridge, an integrated chipset, or the like may be used.

When the information processing apparatus 100 is set in a standby state, the I/O controller 004 is configured to be able to provide continuous power supply to the portable device coupled to a USB terminal, which is the I/F circuit 005, even if the OS is not started, and the continuous power supply is implemented by controlling a power supply control circuit, which is not illustrated in the drawings, in order for the CPU 001 to be able to start the BIOS and the OS.

Next, the wireless communication device 200 will be described. The wireless communication device 200 includes a CPU 006, a third memory 007, a fourth memory 008, an I/F circuit 009, a power supply circuit 010, and an RF circuit 011, which implements wireless communication functionality.

The CPU 006 controls the power supply circuit 010 and the RF circuit 011 and executes firmware stored in the third memory 007.

The third memory 007 is a storage device that stores data used for execution of various types of programs that are executed in the wireless communication device 200. The CPU 006 reads firmware and various types of programs from the third memory 007 and executes them. As the third memory 007, a nonvolatile storage device such as flash memory is used.

The fourth memory 008 is a storage device that temporarily stores programs executed by the CPU 006, a variety of data, data obtained by operations of the CPU 006, and so on. As the fourth memory 008, random access memory (RAM) or the like may be used.

The I/F circuit 009 is an interface for input and output between the information processing apparatus 100 and the wireless communication device 200 and is coupled to a USB terminal of the information processing apparatus 100.

The power circuit 010 is supplied with power through the circuit 009 from the information processing apparatus 100 and controls the power supply for the entirety of the wireless communication device 200.

The RF circuit 011, which includes an antenna for transmitting and receiving radio waves when the wireless communication device 200 coupled to the information processing apparatus 100 and a wireless WAN base station, performs wireless WAN communication based on information stored in a subscriber identity module (SIM) card, which is not illustrated in the drawings.

Next, with reference to FIG. 4, a system related to the present disclosure will be described using an example where a personal computer is assumed as the information processing apparatus 100 and a USB-coupled portable device having wireless communication functionality is assumed as the wireless communication device 200.

The personal computer 100 includes a BIOS 015 stored in a ROM, a power control unit 012 that operates with the BIOS 015, and a first storage unit 013 and a second storage unit 014 that store information used for operating the BIOS 015.

In addition, an I/O controller 016 for controlling hardware, which is an external device coupled to the personal computer 100, is coupled to serve under the personal computer 100 and, beyond the I/O controller 016, for example, a USB terminal 017 is coupled.

In the first storage unit 013 and the second storage unit 014 of the personal computer 100, for example, a driver of a hardware device coupled to the personal computer 100 is stored and a list of external devices that may be coupled to the personal computer 100 is stored. For example, information on FCC certified devices described first is stored in the first and second storage units 013 and 014, which are configured so as to allow the BIOS 015 to determine whether or not, when an external device is coupled to the USB terminal 017, this device is a device that may be used.

The BIOS 015 of the personal computer 100 starts the OS 018, which is basic software. Upon the start of the OS 018, application software 019 runs on the OS 018, so that desired processing is performed. All of the software including the BIOS 015 and the OS 018 is processed by the CPU 020 and a main storage unit 021 in which various kind s of control information to be used are stored.

In the personal computer 100, a mode is provided in which the BIOS 015 is started, and the OS 018 is not started and is kept in a standby state. In this standby state, the power control unit 012 is designed to supply power via the USB terminal 017 to the portable device 200 coupled to the USB terminal 017 and is designed to be able to execute limited command processing at the level of the BIOS 015 together with the portable device 200.

Examples of the command processing executable at the level of the BIOS 15 in the personal computer 100 include the following:

(a) command processing for receiving a request for specific information from the portable device 200 and transmitting specific information (manufacturer information) such as a vendor ID;

(b) command processing for starting the OS 018 by receiving a start signal from the portable device 200; and (c) command processing of notifying the portable device 200 of specification of some of the applications executed by the OS 018 and completion of execution of the specified applications.

Programs for executing the command processing are stored in a nonvolatile manner in the first storage unit 013. Regarding specific information (manufacturer information) such as a vendor ID, the specific information is read and stored in, for example, the second storage unit 014 in a write-protected manner.

The application software 019 stored in the personal computer 100 includes application software for device maintenance, which is an application specified at the time of receiving a start signal via the BIOS 015 from the portable device 200. With this application software, processing of erasing predetermined information among information stored in the personal computer 100 is executed.

Next, the portable device 200 will be described.

The portable device 200 includes a USB terminal 030 for coupling to the personal computer 100 via the USB terminal 017.

The portable device 200 includes a control unit 031 including a CPU, which is not illustrated in the drawings, and a third storage unit 034 and a fourth storage unit 035 are coupled to the control unit 031.

An RF unit 033, which is a wireless communication unit including an antenna (not illustrated) implementing wireless communication functionality, is further coupled to the control unit 031 of the portable device 200 and performs protocol control used for communication.

Note that the portable device 200, which is not limited to this, receives power supply from the personal computer 100 through the USB terminal 030, and the power supply of the portable device 200 is controlled by the power control unit 032.

The third storage unit 034 of the portable device 200 stores data used for execution of various kinds of programs executed in the wireless communication device 200. The control unit 031 of the portable device 200 reads firmware and various programs from the third storage unit 034 and executes them. The third storage unit 34 stores a list indicating specific information of the personal computer 100 that is permitted to use wireless communication functionality of the portable device 200. This specific information is preferably stored in a write-protected manner.

The fourth storage unit 035 of the portable device 200 is used for temporarily storing programs executed by the control unit 031, various types of data, data obtained by operations of the control unit 031, and so on.

The portable device 200 according to the present disclosure is configured to be able to be kept in a standby state in such a manner as to allow for continuous wireless communication, and to be capable of receiving a start signal from the outside. Therefore, the control unit 031 is configured to be able to determine whether or not a start signal is directed to itself, by using a program stored in the third storage unit 034, and to, under the conditions that this start signal has been received and that the personal computer 100 coupled as described below is confirmed as having been permitted to use wireless communication functionality, output a start signal to the personal computer 100.

Here, with reference to FIG. 5, a flowchart illustrating an example of a lock/unlock process of the wireless communication unit in the wireless communication system of the present disclosure will be described. Note that, with reference to FIG. 4, description has been given assuming that the personal computer is an example of the information processing apparatus 100 and the portable device is an example of the wireless communication device 200; however, the process given below is now described using the information processing apparatus 100 and the wireless communication device 200.

The wireless communication device 200 is coupled to the information processing apparatus 100 and is powered on by power supply from the information processing apparatus 100 (S101).

The control unit 031 of the wireless communication device 200 performs USB enumeration, which is a coupling confirmation process with the information processing apparatus 100, (S102) and obtains descriptor information (S103). Although used in the present embodiment, the USB enumeration may be replaced with any process of exchanging information between the information processing apparatus 100 and the wireless communication device 200.

The control unit 031 obtains a vendor ID from the descriptor information and stores the obtained vendor ID in the fourth memory 008 (S104). The control unit 031 starts firmware stored in the third storage unit 034 to compare a vendor ID stored in the third storage unit 034 with the vendor ID obtained in S104 (S105). Here, the vendor ID is taken up as information on certification of regulations with regard to wireless communication functionality; however, the present disclosure includes not only information with regard to wireless communication functionality but also any information indicating whether or not the information processing apparatus 100 to be coupled is an apparatus to which a portable device, such as the wireless communication device 200, may be coupled for use.

Based on the comparison result, the control unit 031 determines whether or not the vendor ID stored in the third storage unit 034 and the vendor ID obtained in S104 are the same (S106).

If the vendor ID stored in the third storage unit 034 and the vendor ID obtained in S104 are the same (S106: Yes), the control unit 031 uses a lock/unlock function of the wireless communication functionality to write an unlock status to the third storage unit 034 (S107). Based on the unlock status written in the third storage unit 034, the control unit 031 causes the wireless communication functionality to be in the unlock status, making it possible to perform wireless communication (S108).

On the other hand, if the vendor ID stored in the third storage unit 034 and the vendor ID obtained in S104 are not the same (S106: No), the control unit 031 uses the lock/unlock function of the wireless communication functionality to write a lock status to the third storage unit 034 (S109). Based on the lock status written in the third storage unit 034, the control unit 031 causes the wireless communication functionality to be in the lock status, which disables the capabilities of wireless communication (S110).

Next, with reference to FIG. 6, the relationships between the states of the information processing apparatus 100 and the lock/unlock process of the wireless communication unit will be described.

Figure 4:
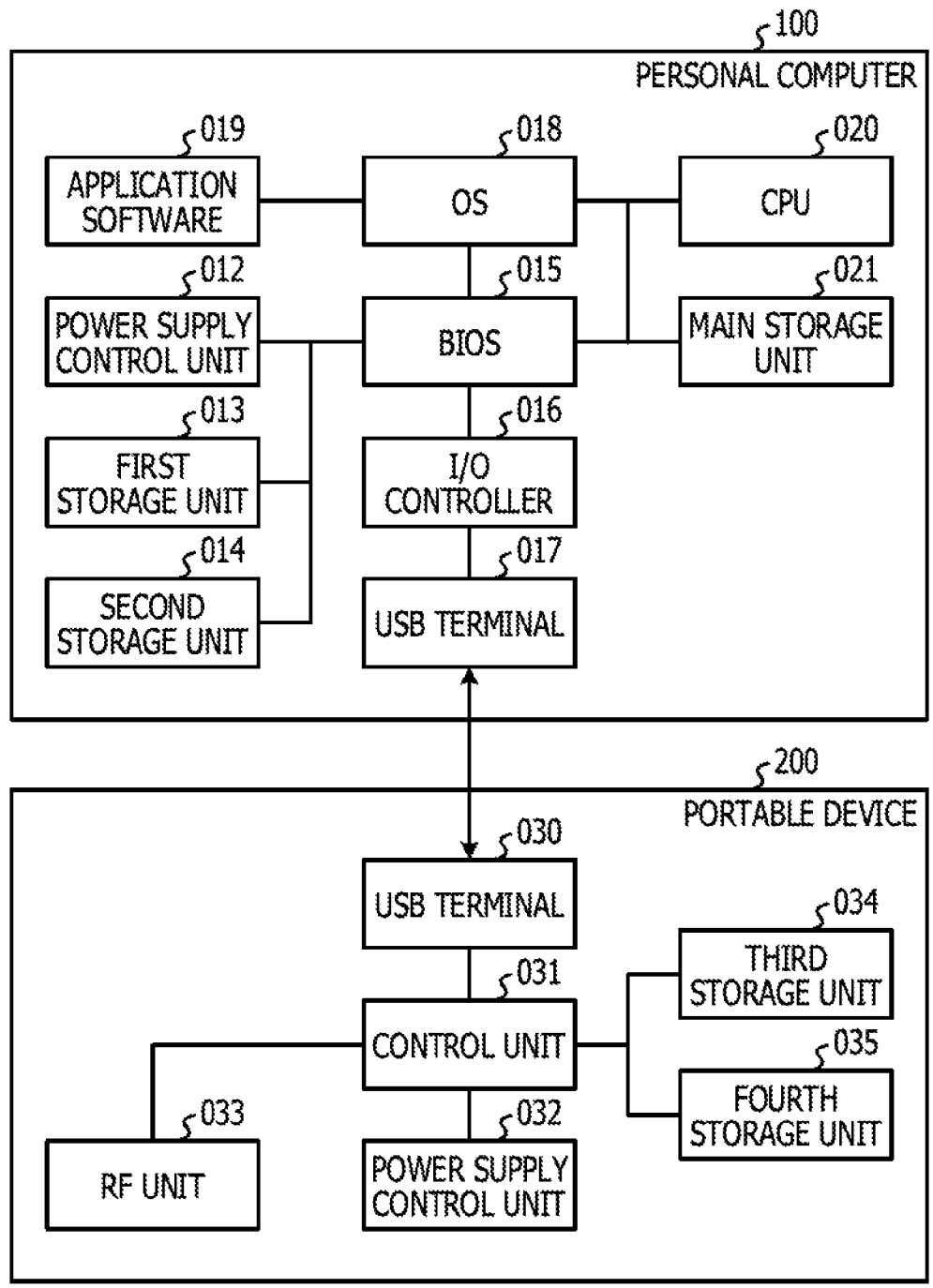
FIG. 4 is a diagram illustrating a system related to the present disclosure composed of a personal computer and a USB-coupled portable device having wireless communication functionality.
Figure 6:
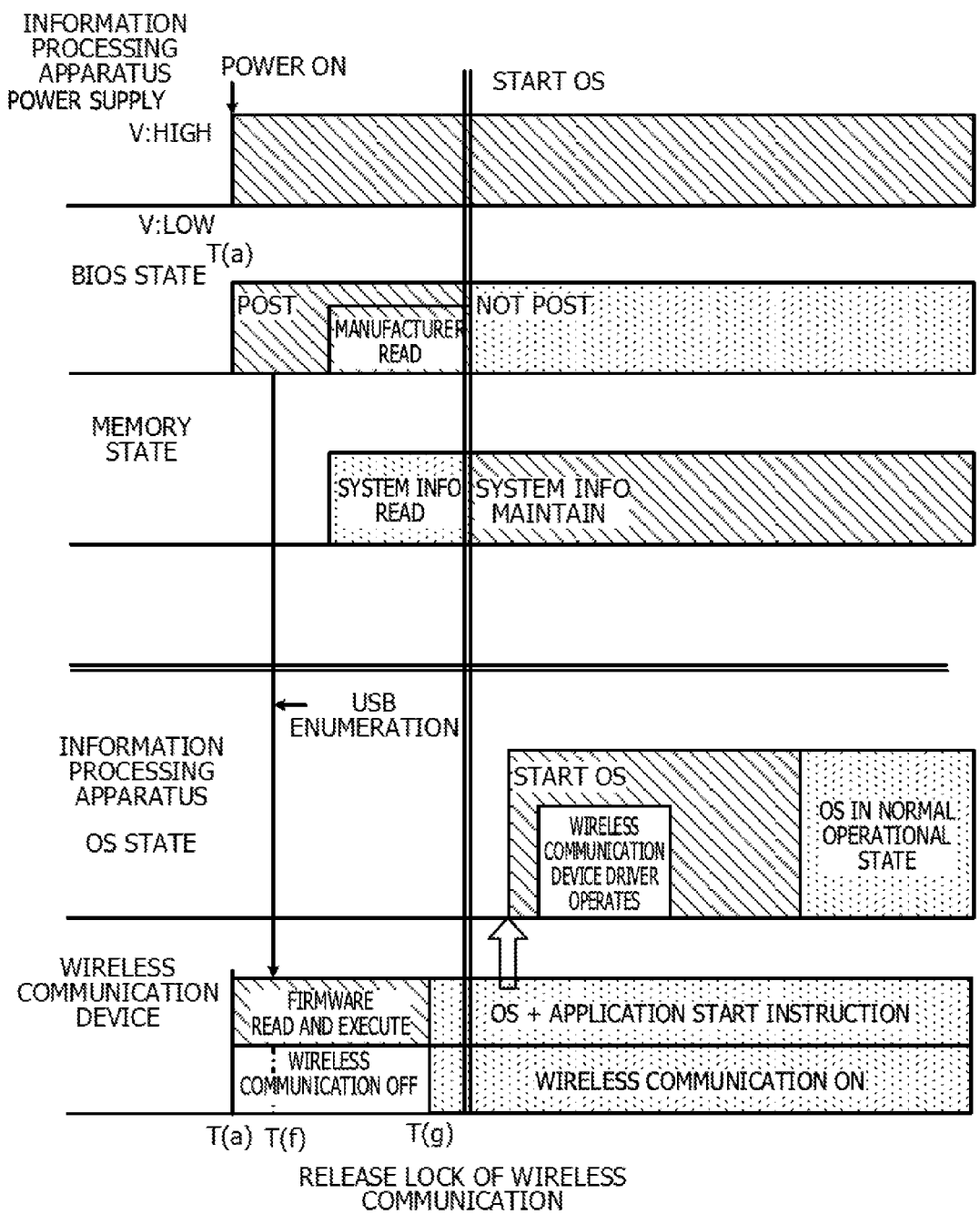
FIG. 6 is a diagram illustrating the relationship between the state of the information processing apparatus and the lock/unlock process of the wireless communication unit.

In FIG. 6, from the upper side of the drawing, the state of the power supply of the information processing apparatus 100 in FIG. 4, the state of the BIOS 015, the state of the second storage unit 014, and the state of the OS 018 are illustrated, and finally the state of the wireless communication device 200 is illustrated. Time lapse is indicated from left to right in the drawing.

As described with reference to FIG. 4, in the present disclosure, the wireless communication device 200 has to operate when the information processing apparatus 100 (FIG. 4) is in a standby state. The information processing apparatus 100 kept in a standby state is powered on, starting the BIOS 015 in FIG. 4. The BIOS 015 executes a process termed a power-on self-test (POST). POST accesses and initializes an external device coupled to the information processing apparatus 100 and obtains manufacturer information, which is a vendor ID, and writes the manufacturer information in the second storage unit 014.

In contrast, in the wireless communication device 200, power is supplied via the USB terminals 017 and 030 by the power-on of the information processing apparatus 100, firmware used for execution is read from the third storage unit 034 and is executed in the control unit 031, and a USB enumeration process with the information processing apparatus 100 is started. The USB enumeration process includes a GET DESCRIPTOR process, during which the wireless communication device 200 obtains a vendor ID stored in the second storage unit 014 from the information processing apparatus 100.

Figure 5:
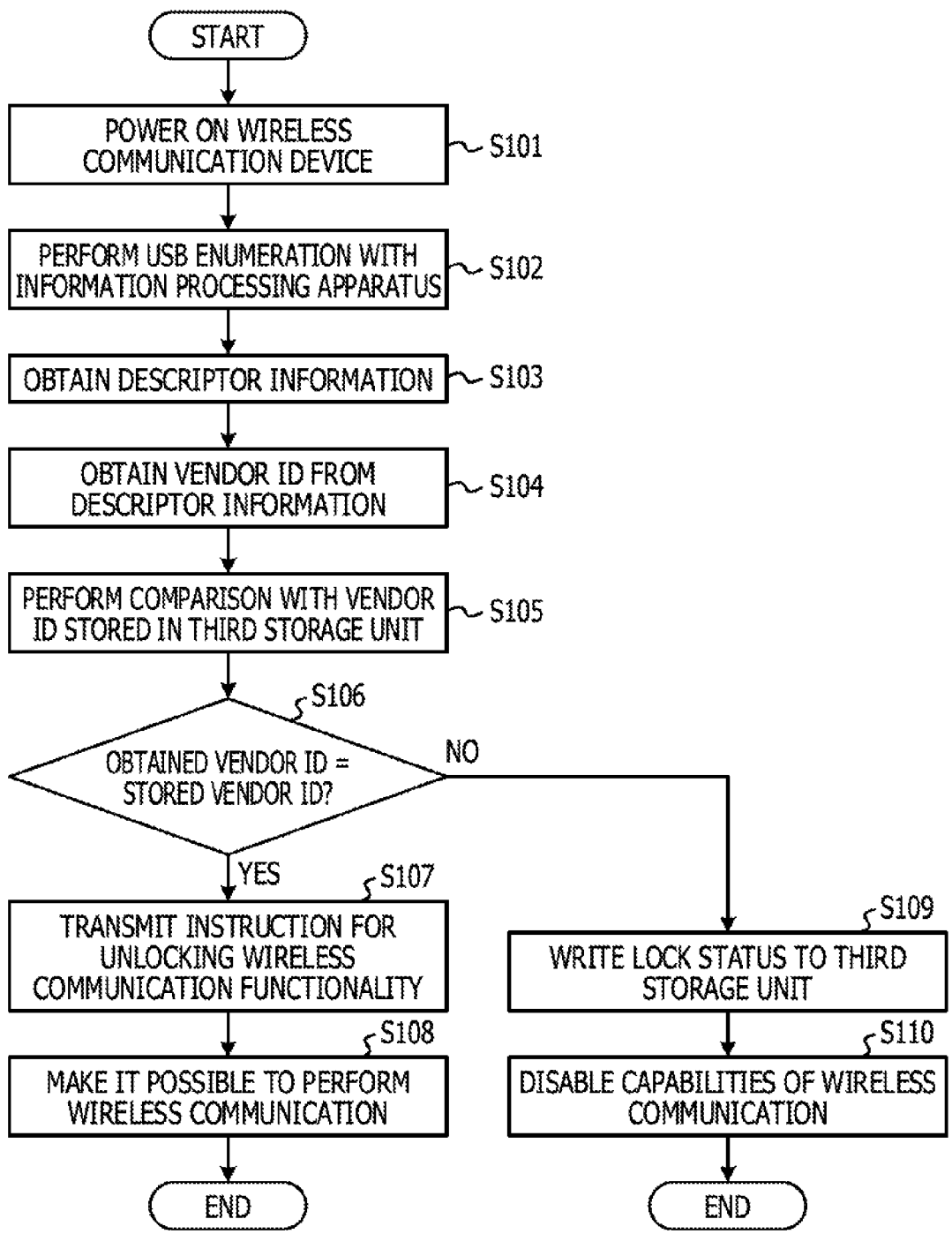
FIG. 5 is a flowchart illustrating an example of a lock/unlock process of a wireless communication unit in a wireless communication system of the present disclosure.

As described in the processing flowchart in FIG. 5, the lock/unlock process of the wireless communication unit is performed.

The information processing apparatus 100, which is in a standby mode, enters the standby state in a situation where the OS 018 is not started.

Then, having received a start signal through wireless communication, the wireless communication device 200 emits a start signal for the OS 018 of the information processing apparatus 100 based on the received start signal under the condition that the wireless communication functionality is unlocked, and thus the OS 018 is started.

Figure 7:
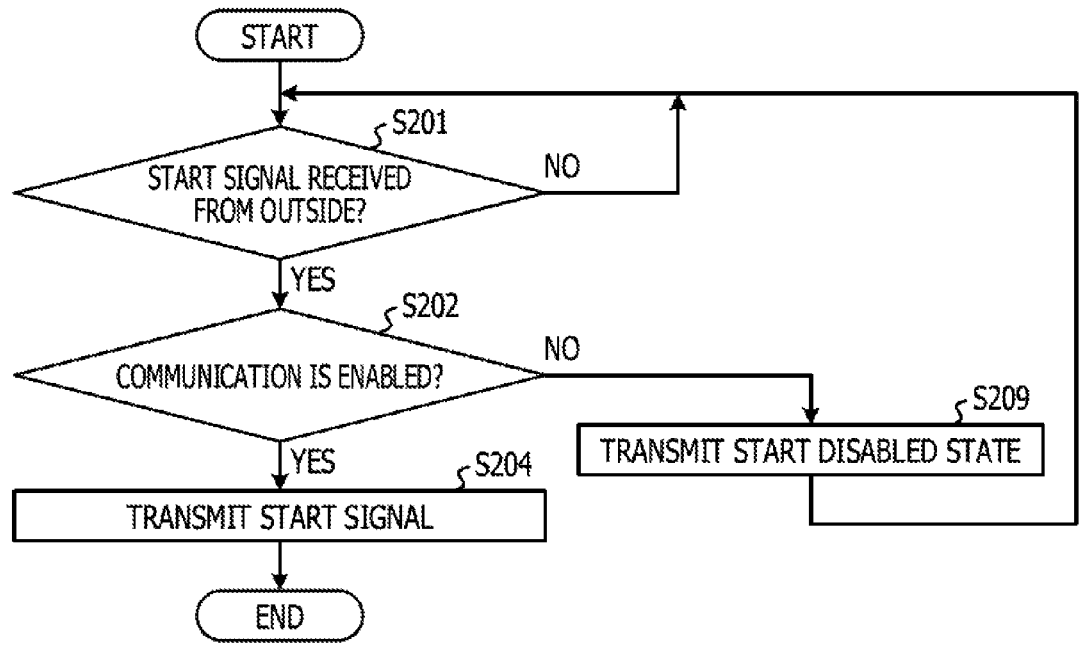
FIG. 7 is a flowchart from receipt of a start signal for the portable device illustrated in FIG. 4 to transmission of the start signal to the information processing apparatus.

Next, with reference to FIG. 7, a flowchart from receipt of a start signal of the portable device 200 in FIG. 4 to transmission of a start signal to the information processing apparatus 100 will be described.

The portable device 200 receives power supply from the personal computer 100 when the personal computer 100 is in a standby state, and thus the wireless communication functionality is in an operational state. In this state, the portable device 200 waits for receipt of a start signal from the outside through wireless communication (S201: No).

If a start signal is received in this state (S201: Yes), the portable device 200 checks a flag of the third storage unit 034, which indicates that the lock/unlock process of the wireless communication unit described with reference to FIG. 5 and FIG. 6 results in an unlock status, to determine whether or not communication is permitted (S202). If, as a result of the determination, communication is permitted (S202: Yes), a start signal is transmitted via the USB terminal 030 to the personal computer 100 (S204). On the other hand, if communication is not permitted (S202: No), the portable device 200 transmits notification of the presence of a start disabled state to a transmission source that has transmitted the start signal (S203) and waits for receipt of a start signal from the outside through wireless communication (S201).

Note that, in this embodiment, since, if communication of the portable device 200 is not permitted when a start signal from the outside is received, a start disabled state is returned to the source that has emitted the start signal, the wireless communication device operates even if communication is not permitted. However, if returning is unnecessary, the wireless communication functionality may be disabled.

Figure 8:
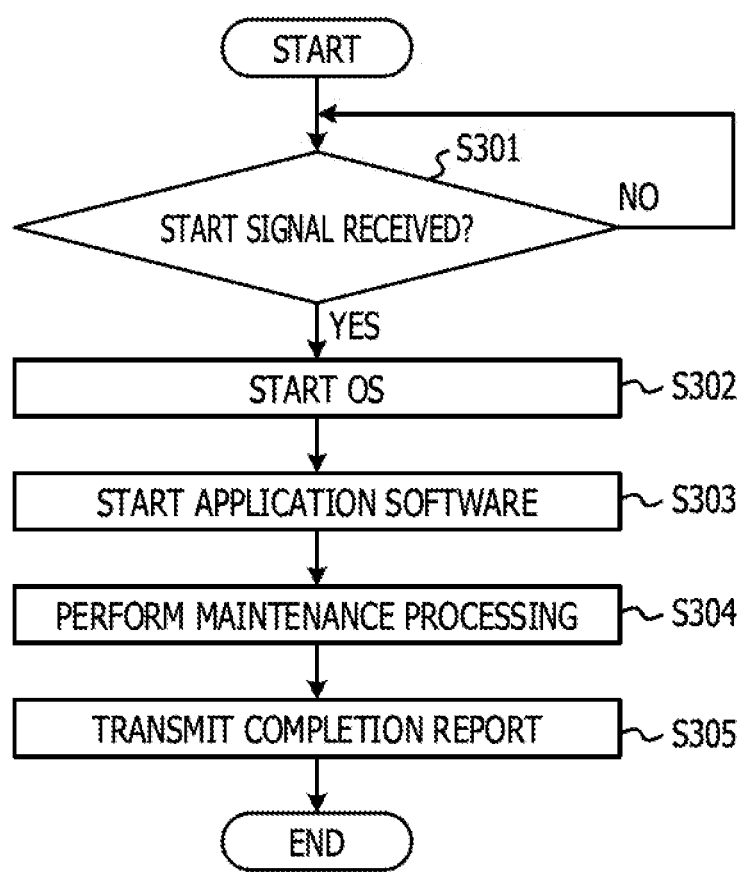
FIG. 8 is a flowchart of processing performed when a start signal is received from the portable device in the personal computer illustrated in FIG. 4.

Next, with reference to FIG. 8, a flowchart of a process when a start signal from the portable device 200 is received in the personal computer 100 in FIG. 4 will be described.

Note that, in this embodiment, description will be given of an example where, for example, information on part of the personal computer 100 is remotely erased from the outside.

The personal computer 100 is in a standby state (in the state where the OS 018 is not started) and is in a condition where, at the level of the BIOS 015, a signal from the portable device 200 may be received.

The BIOS 015 waits for the arrival of a start signal from the portable device 200 (S301: No). If a start signal is received from the portable device 200 (S301: Yes), the BIOS 015 starts the OS 018 (S302). In the start signal, the application software 019 to run is specified (not mandatory).

The personal computer 100 starts the application software 019 specified after the start of the OS 018 (S303) and performs maintenance processing (S304). The maintenance processing is, for example, processing of erasing user information stored in the personal computer 100. This is effective for cases where the personal computer 100 is stolen or lost.

Once the maintenance processing is completed, a completion report is transmitted to the portable device 200 in order to provide notification of the completion to a source that has transmitted the start signal to the portable device 200 (S305). Note that, although not described here, after all the process is completed, the OS 018 may be shut down and enter the standby state again.

Figure 9:
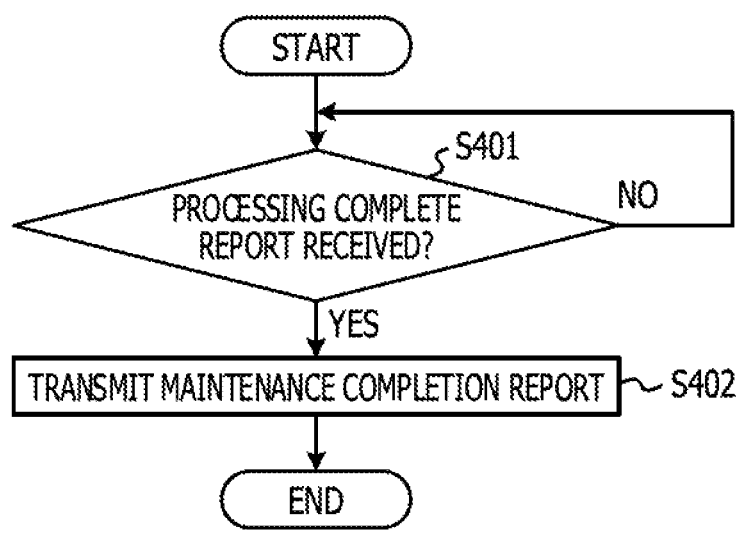
FIG. 9 is a flowchart illustrating a process for processing completion reporting in the portable device illustrated in FIG. 4.

Next, with reference to FIG. 9, a flowchart of a process for a processing completion report in the portable device 200 in FIG. 4 will be described.

The portable device 200 waits for a completion report after transmitting a start signal to the personal computer 100 (S401: No). If a processing completion report is received (S401: Yes), the portable device 200 transmits a maintenance completion report indicating that maintenance processing, as one implementation, has been completed to the transmission source that has transmitted a start signal (S402).

As described above, in the present disclosure, even if an information processing apparatus such as the personal computer 100 is kept in a standby state, the portable device 200 having wireless communication functionality may receive a start signal from the outside while confirming that the portable device 200 is coupled to the information processing apparatus 100 permitted to use wireless communication functionality.

All examples and conditional language provided herein are intended for the pedagogical purposes of aiding the reader in understanding the invention and the concepts contributed by the inventor to further the art, and are not to be construed as limitations to such specifically recited examples and conditions, nor does the organization of such examples in the specification relate to a showing of the superiority and inferiority of the invention. Although one or more embodiments of the present invention have been described in detail, it should be understood that the various changes, substitutions, and alterations could be made hereto without departing from the spirit and scope of the invention.

What is claimed is:

1. A portable device comprising:
a first interface circuit configured to receive, from an information processing apparatus coupled to the portable device, device information of the information processing apparatus;
a second interface circuit configured to receive, from outside device through wireless communication link, a start signal for the information processing apparatus;
a memory configured to store a list of information processing apparatuses that are to be permitted to perform wireless communication with the portable device coupled to the information processing apparatuses; and
a processor configured to:
power on the portable device based on power supply from the information processing apparatus via a wired line;
acquire the device information from the information processing apparatus via the wired line in a lock status in which communication functionality of the second interface circuit is disabled;
compare the device information with the list stored in the memory;
enable the wireless communication functionality of the second interface circuit when a result of the comparison indicates that the portable device is coupled to an information processing apparatus which is permitted to perform wireless communication;
write the lock status of the wireless communication functionality of the second interface circuit in the memory and maintain the lock status when the result of the comparison indicates that the portable device is not coupled to the information processing apparatus which is permitted to perform wireless communication; and
transmit a start signal to the information processing apparatus via the wired line when the start signal is received by using the wireless communication functionality of the second interface circuit after enabling of the wireless communication functionality of the second interface circuit.

2. The portable device according to claim 1, wherein the portable device is coupled via a universal serial bus terminal provided in the information processing apparatus, and receipt of the device information of the information processing apparatus by the first interface circuit is performed during execution of a coupling confirmation process for a device coupled to a universal serial bus corresponding to the wired line by the information processing apparatus.

3. The portable device according to claim 1, wherein the start signal includes information of an instruction that instructs the information processing apparatus to perform maintenance processing, and the processor is configured to, upon receiving information indicating completion of the maintenance processing from the information processing apparatus, transmit information indicating completion of the maintenance processing through the second interface circuit.

4. The portable device according to claim 3, wherein the instruction of maintenance processing is an instruction that instructs the information processing apparatus to perform processing of erasing predetermined information.

5. The portable device according to claim 1, wherein the processor acquires the device information from the information processing apparatus which is in a state input and output control software to control input and output device is executed and basic software to run an application software is not executed.

6. The portable device according to claim 5, wherein the processor transmits the start signal to the information processing apparatus via the wired line to execute the basic software to run the application software when the start signal is received by using the wireless communication functionality of the second interface circuit from the information processing apparatus in the state after enabling of the wireless communication functionality of the second interface circuit.

7. A system comprising:
a portable device; and
an information processing apparatus,
wherein the portable device includes:
   a first interface circuit configured to receive, from an information processing apparatus coupled to the portable device, device information of the information processing apparatus;
   a second interface circuit configured to receive, from outside device through wireless communication link, a start signal for the information processing apparatus;
   a memory configured to store a list of information processing apparatuses that are to be permitted to perform wireless communication with the portable device coupled to the information processing apparatuses; and
   a processor configured to:
      power on the portable device based on power supply from the information processing apparatus via a wired line;
      acquire the device information from the information processing apparatus via the wired line in a lock status in which communication functionality of the second interface circuit is disabled;
      compare the device information with the list stored in the memory;
      enable the wireless communication functionality of the second interface circuit when a result of the comparison indicates that the portable device is coupled to an information processing apparatus which is permitted to perform wireless communication;
      write the lock status of the wireless communication functionality of the second interface circuit in the memory and maintain the lock status when the result of the comparison indicates that the portable device is not coupled to the information processing apparatus which is permitted to perform wireless communication; and
      transmit a start signal to the information processing apparatus via the wired line when the start signal is received by using the wireless communication functionality of the second interface circuit after enabling of the wireless communication functionality of the second interface circuit,
   wherein the information processing apparatus is configured to execute at least input and output control software to control input and output device and basic software to run an application software, the basic software being started, after the input and output control software is started, according to an instruction from the input and output control software, and the first interface circuit of the portable device is configured to request the input and output control software of the information processing apparatus to transmit device information and obtain the device information from the input and output control software.

8. An information processing apparatus comprising:
a third interface circuit coupled to a portable device which has wireless communication functionality, the portable device being used to perform wireless communication by the information processing apparatus; and
a first processor configured to execute an input and output control software to control the interface circuit to transmit device information of the information processing apparatus to the portable device via the third interface circuit, and execute a basic software which is used to run an application software, upon receiving a start signal after receiving permission information indicating enabling the wireless communication functionality from the portable device,
wherein the portable device includes:
   a first interface circuit configured to receive, from an information processing apparatus coupled to the portable device, device information of the information processing apparatus;
   a second interface circuit configured to receive, from outside device through wireless communication link, a start signal for the information processing apparatus;
   a memory configured to store a list of information processing apparatuses that are to be permitted to perform wireless communication with the portable device coupled to the information processing apparatuses; and
   a second processor configured to:
      power on the portable device based on power supply from the information processing apparatus via a wired line;
      acquire the device information from the information processing apparatus via the wired line in a lock status in which communication functionality of the second interface circuit is disabled;
      compare the device information with the list stored in the memory;
      enable the wireless communication functionality of the second interface circuit when a result of the comparison indicates that the portable device is coupled to an information processing apparatus which is permitted to perform wireless communication;
      write the lock status of the wireless communication functionality of the second interface circuit in the memory and maintain the lock status when the result of the comparison indicates that the portable device is not coupled to the information processing apparatus which is permitted to perform wireless communication; and
      transmit a start signal to the information processing apparatus via the wired line when the start signal is received by using the wireless communication functionality of the second interface circuit after enabling of the wireless communication functionality of the second interface circuit.

9. The information processing apparatus according to claim 8, wherein the start signal includes information of an instruction that instructs the information processing apparatus to perform maintenance processing, and the first processor is configured to perform the maintenance processing upon receiving the start signal, and transmit information indicating completion of the maintenance processing to the portable device after the maintenance processing is completed.

10. The information processing apparatus according to claim 9, wherein the instruction of maintenance processing is an instruction that instructs the information processing apparatus to perform processing of erasing predetermined information.

* * * * *